Oct. 23, 1951     S. E. R. PALMQVIST     2,572,511
METHOD FOR PRODUCING DECORATIVE BOWL-SHAPED ARTICLES
OF GLASS BY CENTRIFUGAL ACTION
Filed Dec. 19, 1945
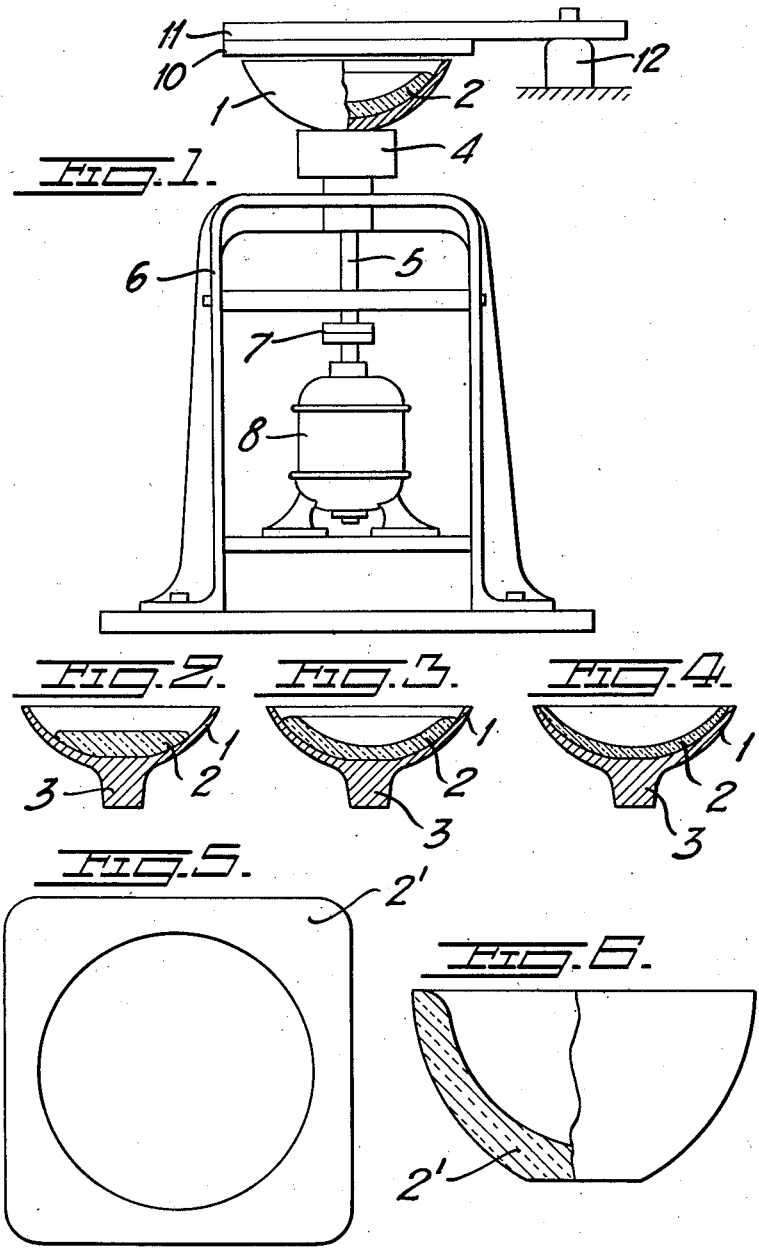
Inventor
Sven Ernst Robert Palmqvist
by Sommers & Young
Attorneys

UNITED STATES PATENT OFFICE 2,572,511

METHOD FOR PRODUCING DECORATIVE BOWL-SHAPED ARTICLES OF GLASS BY CENTRIFUGAL ACTION

Sven Ernst Robert Palmqvist, Orrefors, Sweden

Application December 19, 1945, Serial No. 636,016
In Sweden January 25, 1943

2 Claims. (Cl. 49—85)

The present invention relates to a method for producing dishes, platters, basins, ash-trays, fruit-cups, flower-vases or other cup-shaped or bowl-shaped decorative or ornamental glass articles generally.

Hitherto, such glass articles have been produced by blowing, by rolling in free-hand work or by pressing a molten glass mass. However, these known methods have several disadvantages. For instance, when the glass is blown to breaking, a great deal of the uppor portion of the blown glass article is broken off and the surface of break must be ground, whereas when the glass is blown to expanded form, a certain portion of the glass article must be cut off and the bottom surface of the glass article must be ground. When a hollow glass article is produced by rolling in free-hand work, the internal surface of the glass article will become rough because it was in contact with a wooden body, and because this method causes a broken surface at the bottom of the glass article, this surface must be ground. Thus, both on blown glass articles and rolled glass articles a grinding operation must be performed—and then also the usual polishing procedure. Pressed glass articles cannot be used at all in such cases in which the ornamental or decorative demands are rather great, because the surfaces of the pressed glass articles present dots or other marks after the contact with the parts of the press-mould.

Furthermore, it has been suggested to produce glass cups by centrifuging glass in a rotating mould, but these prior proposals had no success and could not be used in practice, because the prior inventors were not aware of the conditions necessary for obtaining glass cups by centrifuging. As a matter of fact, if one would try to centrifuge a thin-walled glass cup, one would find that creases or crumples were formed in the wall. If one were to try to eliminate this action by increasing the wall thickness, the rising glass mass would tend to flow over the brim of the mould. If one were to try to prevent this overflowing by means of a stop ring attached to the brim of the mould, this ring would cause appreciable dots on the flat horizontal brim surface of the glass cup, and no smooth rounding from the internal surface to the flat horizontal brim surface would be obtained.

The invention has for its object to make possible the manufacture of cup-shaped or bowl-shaped thick-walled decorative glass articles in such manner that in any case the procedures of breaking off or cutting off the superfluous glass parts and subsequent grinding are eliminated, and in certain cases even the procedure of polishing is avoided.

Another object of the invention is to make possible the manufacture of thick-walled glass cups or bowls in such manner that the horizontal brim surface has a smooth appearance and merges into the internal hollow surface with a smooth rounding.

According to the invention, the rising of the glass mass over the mould is limited by a stop means which extends over the mould and in relation to which the mould with the glass mass is rotating, and the quantity of the glass and the speed of rotation are so adjusted that a thick-walled glass cup is produced. During this centrifugal procedure the number of revolutions per unit time is increased only to such a maximum value, that the centrifuged glass body forms a cup or bowl the internal surface of which from the bottom portion, this portion inclusive, to the border or edge line of the external surface has a continuous outline or configuration which is parabolic at least on the bottom portion and on the greater part of the remaining internal surface, this surface emerging into the flat horizontal brim surface with a smooth rounding.

In this way a thick-walled cup-shaped or bowl-shaped glass article is produced which by the process of manufacture has obtained the shape wanted, so that it will not be necessary to grind off or cut off any portions at all, and which article at the same time is without any dots and other marks not only on the internal surface, this surface being contacted only by air, but also on the external surface and on the horizontal brim surface which nevertheless were in contact with the mould and with the stop means, respectively, so that even no grinding for removing such marks is necessary. The only finishing procedure which in certain cases may be performed, is a polishing procedure, yet only on the external surface. The fact is that the internal surface immediately upon the process of manufacture is absolutely smooth and cannot be made better by polishing, even if the internal surface were as accessible to polishing means as the external surface. The external surface is initially formed by the process of manufacture with nearly the same smooth condition as the internal surface, and it can easily be made absolutely perfect by polishing if the demands for a bright appearance are very high. Moreover, the glass in the article produced seems to have obtained a much finer structure than that obtained by blowing, rolling in free-hand work or pressing, probably on account of the fact, that during the process of forming the glass article in question, the glassmass is subjected to a pressure which is produced not by a pressing plunger or like mould part but by centrifugal force.

Thus, the centrifuged cup-shaped or bowl-shaped, namely hollow glass articles are in such condition that they are ready for use immediately upon completion of the process of manufacture and they have a much better appearance than such glass articles hitherto produced in moulds and ready for use immediately upon the manufacture, that is, the pressed glass articles. After a polishing treatment on the external surface they are superior to the most excellent glass articles hitherto produced, namely the blown glass articles finished by grinding and polishing. Thus, the invention provides for the production of hollow glass articles of a high class, eliminating at least two stages of the manufacturing operation, namely (a) breaking or cutting and (b) grinding and, in certain cases, (c) polishing.

The method according to the present invention will be more clearly described in connection with the annexed drawing illustrating, by way of example, a device for carrying out said method as well as a typical product of the invention.

Fig. 1 shows a diagrammatic elevation of a centrifuging machine and a device for carrying out the method according to the invention.

Figs. 2, 3, and 4 show vertical central sections through the mould with the glass mass in three different stages of the moulding procedure.

Figs. 5 and 6 show a bowl in plan view and elevation, partly in vertical section, which bowl is produced in accordance with the invention.

A preferred device for manufacturing hollow, that is, cup-shaped or bowl-shaped decorative glass articles by centrifuging according to the invention comprises a non-divided open mould the cross-section of which is enlarged upwardly and which is coupled to a central rotatable driving body, preferably connected with a driving device or transmission allowing control of the rise of the glass mass along the internal surface of the mould. Preferably, the arrangement is such that the mould can be taken off its driving body and the glass article can be turned out from the mould. Such arrangement allows a very quick manufacture.

In the drawing, the numeral 1 refers to the open mould which can be of the divided type but preferably is non-divided, and the numeral 2 designates the molten glass mass. The walls of the open mould 1 are diverging upwards. The mould 1 is provided with a slightly conical stud 3 (Figs. 2, 3, and 4) which stud depends centrally from the bottom of the mould and by means of which the mould can be mounted in a corresponding aperture or opening in a driving body 4. The driving body 4 is mounted by means of a vertical shaft 5 in a frame 6 and by means of a coupling 7 is in driving connection with an electric motor 8 which is arranged vertically in the frame and the speed of which is variable in any known manner. The stop means serving to limit the rising of the glass mass over the mould may comprise a stop disc 10 which is adapted to be arranged immediately over the mould and which may be carried by a lever 11 which is swingably mounted on a vertical journal 12, so that said stop disc can be turned away from the position above the mould, when the mould is to be removed from the body 4.

The device described is, according to the invention, used in the following manner. Preferably, the mould 1 is pre-heated, for instance by putting a molten glass mass in the mould and then removing it from the mould after the heating of the same. The mould is coupled to the driving body 4 by pressing its conical stud into the corresponding aperture of the driving body 4. A suitable amount of molten glass is put in the mould and this glass mass must have such high temperature that it easily can take form by centrifugal action. The mould is rotated and the speed of rotation is regulated by the motor 8. Under centrifugal action the molten glass mass is forced from the bottom along the internal surface of the mould. This procedure is illustrated clearly in Figs. 2, 3, and 4; Fig. 2 showing the mould with the glass mass immediately before the centrifugal operation; Fig. 3 showing the mould with the glass mass at the beginning of the centrifuging; and Fig. 4 showing the mould with the glass mass subjected to the maximum centrifugal action, corresponding, for instance, to about 500 revolutions per minute. As illustrated in said figures, during the process of centrifuging a cup-shaped or bowl-shaped cavity is formed in the central portion of the glass mass, so that the internal shape is imparted to the glass body. Of course, the centrifuging must not be effected at such a high number of revolutions that a bottom opening is formed centrally. The rotation of the mould must not be stopped until the glass body has cooled down and gotten to such a hard condition that the glass body maintains the shape produced by the centrifugal action. Then, the glass article is finished and can be removed from the mould after the stop disc 10 has been turned away and the mould has been taken out from the driving body 4. Then, the mould is mounted on the driving body again and a new molten glass mass 2 is put into the mould, the stop disc is moved into position over the mould, and so on. The centrifuged glass articles are moved through a cooling furnace of known type.

A typical product of the invention is illustrated in Figs. 5 and 6. Fig. 5 shows that the internal and external surfaces of the glass article 2' can differ essentially from each other as to their shape, contrary to the high-class glass articles hitherto known and produced by blowing or rolling in free-hand work.

In certain cases the mould can be of the divided type, especially for production of glass articles having angular outsides, the plane of division in such moulds then being laid through any one of the edge-lines of the outside. In this case it be not necessary that the cross-section of the mould is enlarged upwards.

If desired one common motor can be used for a plurality of centrifugal shafts. Instead of a motor having a device for varying the speed, a hand crank in combination with a suitable gearing or transmission can be used.

What I claim is:

1. A method of producing decorative glass articles, comprising, in combination, centrifuging a predetermined quantity of molten glass in a rotating mold so as to cause the molten glass to flow upwardly around the wall of the mold, selecting the speed of rotation so as to produce a thick-walled glass article, and holding a stop means stationarily for limiting the rising of the glass mass to prevent flow over the mould edge.

2. A method of producing decorative glass articles, comprising, in combination, centrifuging a pre-determined quantity of molten glass in a rotating mold so as to cause the molten glass to flow upwardly around the wall of the mold, during such centrifugal procedure increasing the number of revolutions per unit time only to such a maximum value that the centrifuged glass mass forms a thick-walled cup-shaped body, the internal surface of which from the bottom portion, this portion inclusive, to the edge line of the external surface has a configuration which is parabolic at least on the bottom portion and on the greater part of the remaining internal surface, and holding a stop means stationarily for limiting the rising of the glass mass to prevent flow over the mold edge.

SVEN ERNST ROBERT PALMQVIST.

REFERENCES CITED

The following references are of record in the file of this patent:

UNITED STATES PATENTS

| Number | Name | Date |
|---|---|---|
| 443,033 | Ambler | Dec. 16, 1890 |
| 669,119 | Krank | Mar. 5, 1901 |
| 793,299 | Jewett | June 27, 1905 |
| 1,190,145 | Gift | July 4, 1916 |
| 1,301,378 | Bruner et al. | Apr. 22, 1919 |

FOREIGN PATENTS

| Number | Country | Date |
|---|---|---|
| 634,847 | France | Dec. 9, 1927 |